(12) United States Patent
Hernandez et al.

(10) Patent No.: US 9,740,640 B2
(45) Date of Patent: Aug. 22, 2017

(54) SYSTEM INTEGRATED TEAMING

(75) Inventors: Hendrich M. Hernandez, Round Rock, TX (US); Lei Wang, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 2027 days.

(21) Appl. No.: 12/237,576

(22) Filed: Sep. 25, 2008

(65) Prior Publication Data

US 2010/0077409 A1 Mar. 25, 2010

(51) Int. Cl.
*G06F 15/173* (2006.01)
*H04L 29/06* (2006.01)
*G06F 13/10* (2006.01)

(52) U.S. Cl.
CPC ................ *G06F 13/102* (2013.01)

(58) Field of Classification Search
CPC ............... H04L 41/50; H04L 41/08
USPC ......................................... 709/224
See application file for complete search history.

(56) References Cited

U.S. PATENT DOCUMENTS 7,082,530 B1 * 7/2006 Diamant ................ 713/153
7,305,461 B2 * 12/2007 Ullman ................ 709/223
7,454,502 B2 * 11/2008 Grimm et al. ............. 709/226
7,586,842 B2 * 9/2009 McGee et al. ............. 370/218
7,693,044 B2 * 4/2010 Jha et al. .................. 370/216
7,801,517 B2 * 9/2010 Silvestri .................... 455/423
7,877,519 B2 * 1/2011 Eldar ........................ 709/250
8,005,013 B2 * 8/2011 Teisberg et al. ........... 370/254

OTHER PUBLICATIONS

Jianwen Yin, Wei Liu and Lei Wang, Methods to Model NIC Teaming and Load Balancing, U.S. Appl. No. 11/558,916, filed Nov. 12, 2006.

* cited by examiner

*Primary Examiner* — Phuoc Nguyen
*Assistant Examiner* — Kishin G Belani
(74) *Attorney, Agent, or Firm* — Haynes and Boone, LLP

(57) ABSTRACT

A network teaming system includes one or more subsystems to provide a hardware system integrated teaming assistant (SITA hardware), provide a software system integrated teaming assistant (SITA software) operable with the SITA hardware and provide a feature checking and enablement system (FCE), wherein the FCE determines one or more networking features for members of a team coupled together on a network, and wherein the SITA hardware in combination with the SITA software perform a networking feature for a member of the team which does not have the capability to perform the networking feature.

17 Claims, 3 Drawing Sheets

SYSTEM INTEGRATED TEAMING

BACKGROUND

The present disclosure relates generally to information handling systems, and more particularly to a system of integrated teaming to provide highest level common functionality supported by team members and system hardware for an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

With regard to IHSs, teaming allows an IHS in a group of IHSs to take advantage of multiple network interface cards (NICs) or local area network (LAN) on motherboard (LOM) in a system by grouping the NICs or LOMs together in a team for load balancing, fault tolerance, and link aggregation.

Typically, teaming is provided through a software intermediate driver. Teaming uses the intermediate driver to group physical adapters into a team that acts as a single virtual adapter. The intermediate driver serves as a wrapper around one or more base drivers, thereby providing an interface between the base driver and a network protocol stack.

A problem with teaming, especially multi-vendor teaming, is that the team (e.g., a virtual adapter) will only have the lowest common level of functionality supported by all the team members. For example, there may be a situation where a user is trying to form a four member team and three members support a jumbo frame or any other advanced networking features, but one member doesn't support this particular feature. In such a situation, the team formed by these four members will not support the jumbo frame or other advanced networking features that one or more team members do not support. In addition, a member may support an advanced networking feature, but the feature is not enabled for that member. In other words, the virtual adapter formed to represent the team can only support enabled features supported by all team members. The reason for this is that if the team takes up a task which is not supported on one of the team members, then that team member will not be able to accomplish the task during load balancing or fail over operation.

Features like transfer control protocol (TCP) Offload Engine (TOE), receive side scaling (RSS), internet small computer system interface (iSCSI) offload, TCP/internet protocol (IP) checksum offload, and NIC hardware assisted features are not generally supported or enabled by all vendors and on all the available NICs. Therefore, it is common for a team formed by these NICs and LOMs to be running with a set of much reduced features. This may occur when one or more features are either not available or not enabled on certain adapters for some of the team members. As a result, this could cause information/task sharing performance degradation, limit users from using advanced network features, and cause a user to pay for NIC/LOM hardware and software functionalities that they are unable to use.

Accordingly, it would be desirable to provide an improved system of integrated teaming absent the disadvantages discussed above.

SUMMARY

According to one embodiment, a network teaming system includes one or more subsystems to provide a hardware system integrated teaming assistant (SITA hardware), provide a software system integrated teaming assistant (SITA software) operable with the SITA hardware and provide a feature checking and enablement system (FCE), wherein the FCE determines one or more networking features for members of a team coupled together on a network, and wherein the SITA hardware in combination with the SITA software perform a networking feature on behalf of a member of the team which does not have the capability to perform the networking feature.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
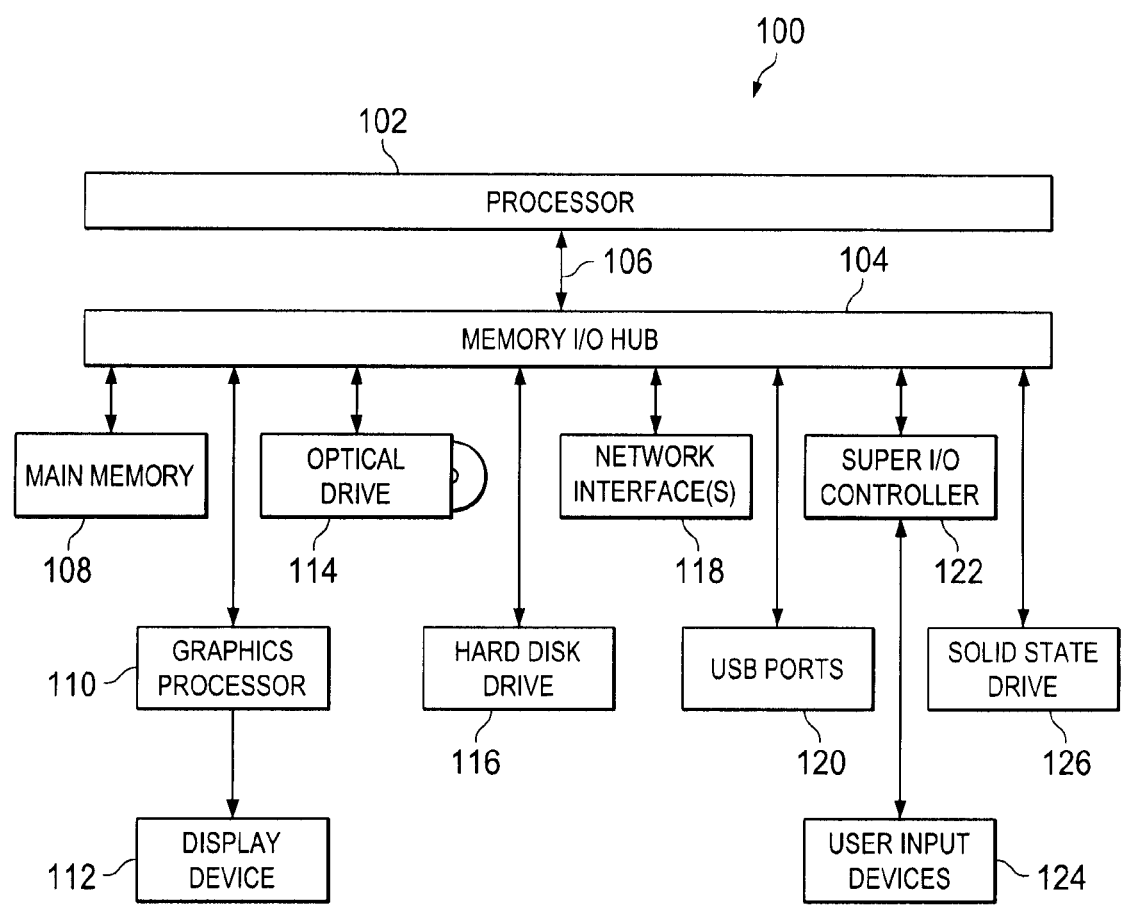
FIG. 1 illustrates a block diagram of an embodiment of an information handling system.

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

Figure 2:
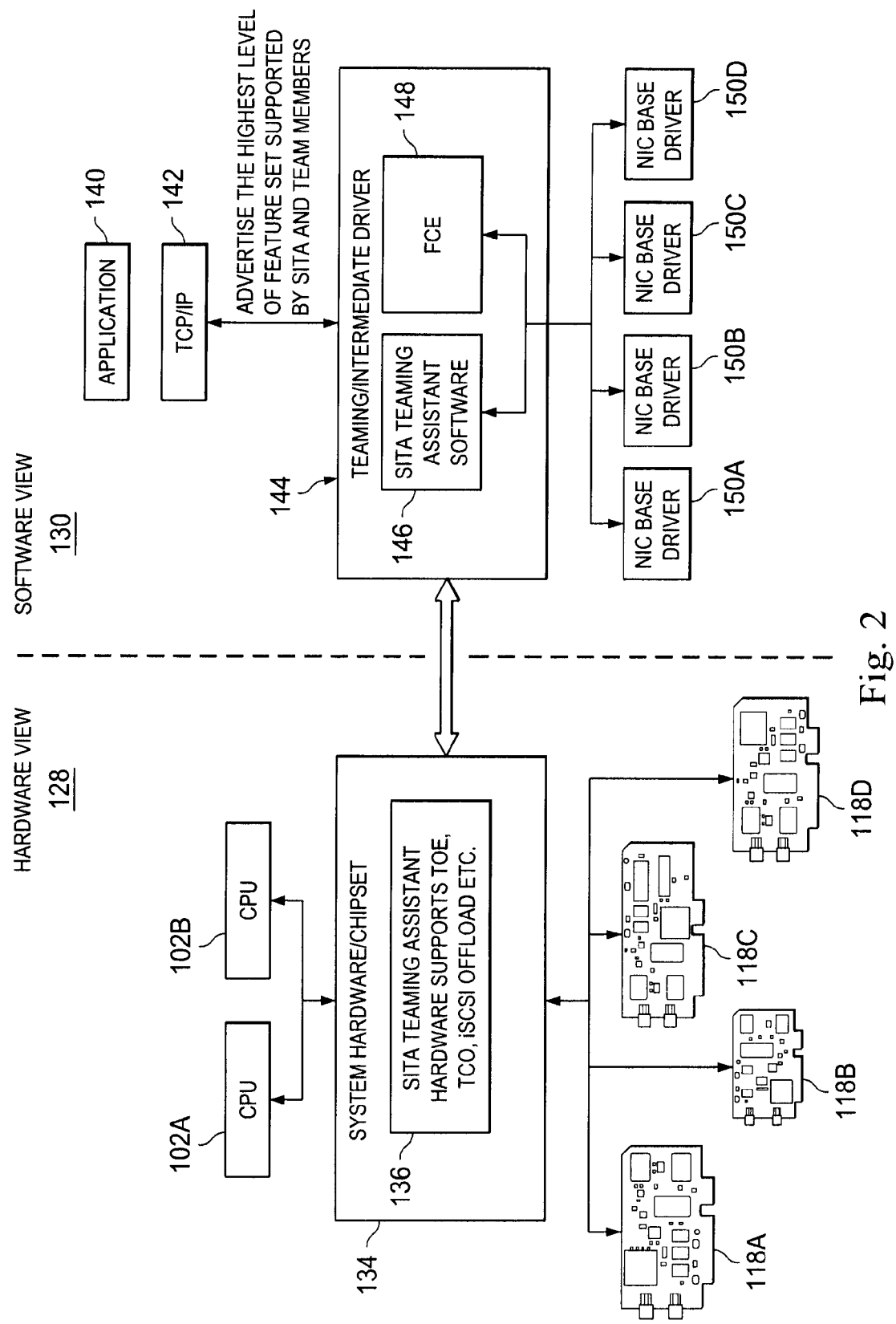
FIG. 2 illustrates a block diagram of embodiments of hardware and software for an enhanced teaming feature support architecture of an information handling system.

FIG. 2 illustrates a block diagram of embodiments of hardware and software for an enhanced teaming feature support architecture of an information handling system. Traditionally in a networking team situation, the team will have the lowest common level of functionality supported by all the team members. However, the present disclosure allows the team to utilize the advanced networking features of the more capable features through auto detect/enable of any advanced features and system integrated device assisted teaming. In other words, the present disclosure will not only have the capability to enable certain advanced features that were disabled to achieve the highest possible common level of native team member support but also have the capability to fake the advanced feature support when the native support is not available on one or more team members but support it through system integrated device hardware or software on behalf of one or more team members. Examples of contemplated features that the present disclosure may help to perform, either in system integrated hardware or through software emulation include, but are not limited to, flow control/speed, interrupt moderation, transport control protocol (TCP) checksum offload, user datagram protocol (UDP) checksum offload, internet protocol (IP) checksum offload, transport control protocol/internet protocol (TCP/IP) offload, internet small computer system interface (iSCSI) offload, jumbo frame, large send offload, receive side scaling (RSS) and transmit side scaling (TSS).

Included in FIG. 2 are both a hardware view 128 of a portion of an embodiment of an IHS 100 and a software view 130 of an embodiment of the teaming system operable on the IHS 100. As should be readily understood by a person having ordinary skill in the art, the hardware and the software work together to perform the teaming functions. FIG. 2 shows four team members coupled together via the network interfaces 118A, 118B, 118C and 118D and via the network interface card (NIC) base drivers 150A, 150B, 150C and 150D for the teaming. However, any number of team members may couple together with the systems and methods of the present disclosure. The hardware 128 illustrates a pair of processors 102A and 102B coupled with a system hardware/chipset 134. A chipset is generally understood to be a group of devices (e.g., integrated circuits) that may be coupled together to form a portion of the IHS 100. The chipset 134 couples to a number of network interfaces 118A-118D, which allow the different team members to couple together and communicate with one another via a network. The different network interfaces 118A-118D may have different feature sets and different enablement status for available features. It is to be understood that any type of network, including different speed networks, may be used to couple the team members.

The system hardware/chipset 134 includes system integrated teaming assistant (SITA) hardware 136. The SITA hardware is additional hardware couple with the chipset 134 to perform the tasks of any NIC 118A-11D. The SITA hardware 136 may be a stand alone device coupled with the chipset 134 or may be incorporated into the chipset 134. The SITA hardware 136 In an embodiment, the SITA hardware 136 and associated software 146 will advertise system integrated hardware supported advanced network features plus the team member supported features to the higher layer or clients of the team. For example, system chipset hardware 136 could support transfer control protocol (TCP) Offload Engine (TOE), receive side scaling (RSS), internet small computer system interface (iSCSI) offload, TCP/internet protocol (IP) checksum offload (TCO), and a variety of other NIC 118 hardware assisted features. During operation, the SITA hardware 136 and SITA software 146 will check to see if a feature is supported by an individual team member. If a certain feature is not supported by a team member, the SITA 136, 146 will perform the task on behalf of the team member. Otherwise, the SITA 136, 146 will just let the team member handle the task. This will allow the team to support as many features as supported by the system integrated hardware and make best use of available resources. In an embodiment, whoever is communicating through the team will not notice any difference in operation or communication compared to a team which actually supports all these features on each team member.

The software view 130 includes an application layer 140, a TCP/IP layer 142, a teaming/intermediate driver 144, and a number of NIC base drivers 150A, 150B, 150C and 150D. The teaming intermediate driver 144 includes system integrated teaming assistant (SITA) software 146 operatively coupled with a feature checking and enablement (FCE) software 148. The FCE 148 is an intelligent NIC/local area network (LAN) on motherboard (LOM) feature checking and enablement software component operable to determine whether one or more certain advanced communication features is supported and enabled on all team members. If the certain feature is supported, but not enabled, the FCE 148 may enable the feature on that team member to allow others on the team to use the feature. The FCE 148 may be part of intermediate driver 144 and/or the SITA teaming assistant software 146. In an embodiment, the FCE 148 utilizes a dedicated processor 102 core to use for emulation. In an embodiment, hardware supported features receive a higher priority than do software emulated features of the same kind.

Figure 3:
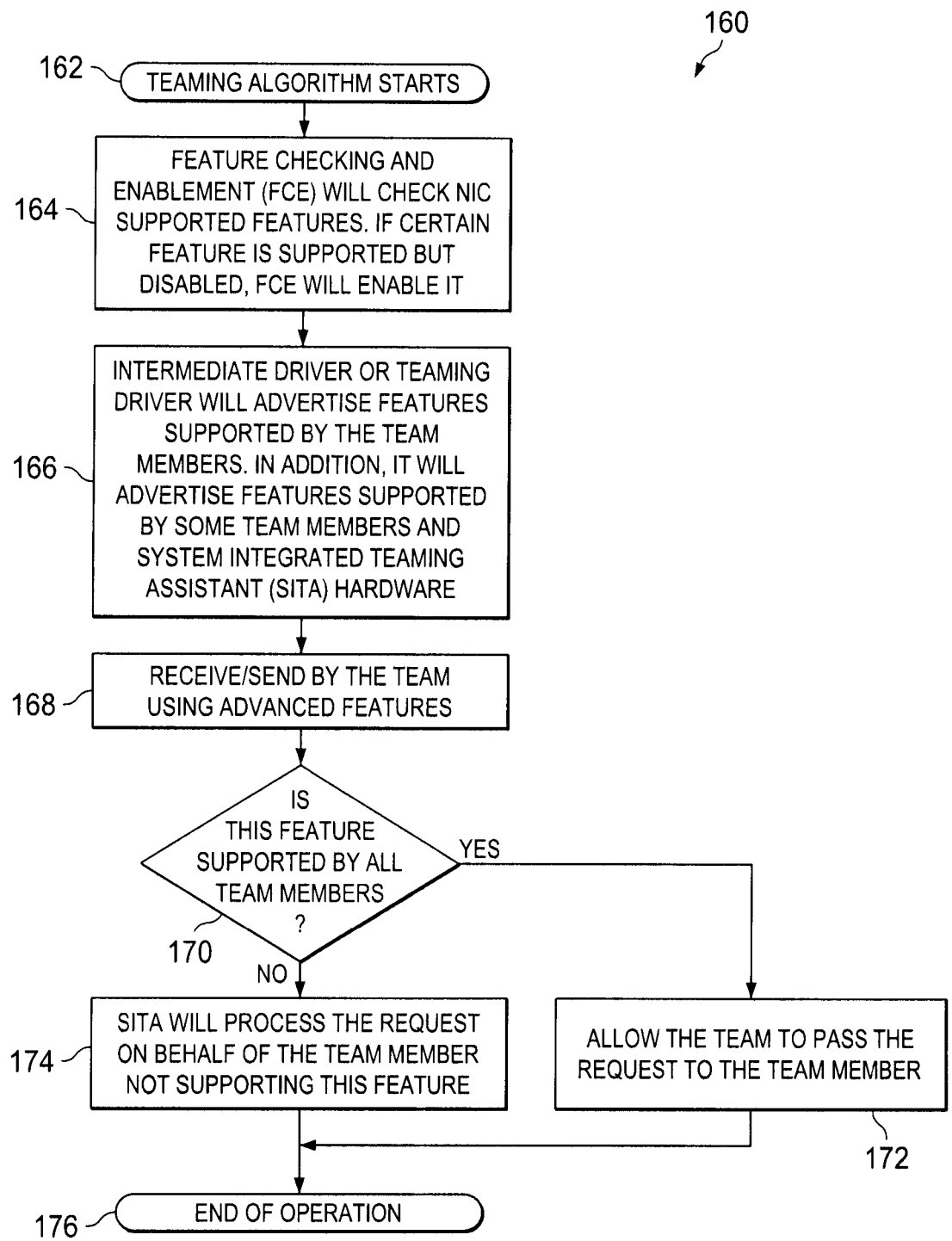
FIG. 3 illustrates a flow chart of an embodiment of a method for enhanced teaming support.

FIG. 3 illustrates a flow chart of an embodiment of a method for enhanced teaming support 160. The method 160 starts at 162 where the IHS 100 is involved in a teaming operation. Next, the method 160 proceeds to block 164 where the FCE 148 checks the NIC supported features. In an embodiment, if certain supported features are supported, but disabled, the FCE 148 will enable the feature. The method 160 then proceeds to block 166 where the teaming/intermediate driver 144 advertises available features supported by the different team member. In addition, the teaming/intermediate driver 144 advertises available features supported by some team members and features supported by the SITA hardware 136. This allows those team members without the feature to learn the available features and to use the SITA hardware 136 and SITA software 146 to perform the features not available on that team member. Nest, the method 160 proceeds to block 168 where data/communications are sent/received by members of the team using the features. Then, the method 160 proceeds to decision block 170 where the method 160 determines whether the certain feature is supported by all of the team members. If yes, the method 160 determines that the certain feature is supported by all of the team members, the method 160 proceeds to block 172 where the method 160 allows the team to pass the request to the team member and then the method 160 ends at block 176. If no, the method 160 determines that the certain feature is not supported by all of the team members, the method 160 proceeds to block 174 where the SITA hardware 136 and the SITA software 146 processes the request on behalf of a team member not supporting this feature. The method 160 then ends at block 176.

It should be readily understood by a person having ordinary skill in the art that the FCE 148 may automatically enable one or more advanced network features that is/are not enabled when forming a team to allow the team to use the feature. It should also be readily understood that the SITA 136, 146 may allow a team to use the most advanced networking features available within the team even if one or more of the team members do not support those features on their IHS 100. The advanced networking features may be carried out on behalf of those team members without the features and the system may allow the member with the feature to be bypassed by the SITA 136, 146 if the feature is supported by that team member.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A network teaming system, comprising:
a bus that is configured to couple to a plurality of network interface components; and
a centralized teaming device that is coupled between the bus and at least one processor, wherein the centralized teaming device includes hardware and software and is configured to:
establish a team with the plurality of network interface components when the plurality of network interface components are coupled to the bus;
determine whether a plurality of network features are supported and enabled on each of the plurality of network interface components when the plurality of network interface components are coupled to the bus;
in response to determining that a first network interface component of the plurality of network interface components supports a first network feature and the first network feature is not enabled on the first network interface component, enable the first network feature on the first network interface component;
in response to determining that a second network interface component of the plurality of network interface components does not support a second network feature that is supported by the hardware included in the centralized teaming device, use the hardware included in the centralized teaming device to process requests needing support for the second network feature for the second network interface component that does not support the second network feature such that those requests are not processed by hardware in any of the plurality of network interface components; and
advertise the first network feature and the second network feature to a higher layer.

2. The network teaming system of claim 1, wherein the centralized teaming device is further configured to:
advertise the second network feature that is supported by the hardware included in the centralized teaming device to the second network interface component that does not support the second network feature.

3. The network teaming system of claim 1, wherein the centralized teaming device is further configured to:
automatically determine whether the plurality of network features are supported and enabled on each of the plurality of network interface components in response to the establishment of the team that includes the plurality of network interface components.

4. The network teaming system of claim 1, wherein at least one of the plurality of network interface components includes a local area network (LAN) on motherboard (LOM).

5. The network teaming system of claim 1, wherein at least one of the plurality of network interface components includes a network interface card (NIC).

6. The network teaming system of claim 1, wherein the hardware included in the centralized teaming device is associated with a first priority to process requests needing support for the second network feature that is higher than a second priority associated with the software included in the centralized teaming device processing request needing support for the second network feature.

7. An information handling system (IHS) comprising:
a processor;
a plurality of network interface components; and
a centralized teaming device coupling the plurality of network interface components to the processor, wherein the centralized teaming device includes hardware and software and is configured to:
establish a team with the plurality of network interface components;
determine whether a plurality of network features are supported and enabled on each of the plurality of network interface components;
in response to determining that a first network interface component of the plurality of network interface components supports a first network feature and the first network feature is not enabled on the first network interface component, enable the first network feature on the first network interface component;
in response to determining that a second network interface component of the plurality of network interface components does not support a second network feature that is supported by the hardware included in the centralized teaming device, use the hardware included in the centralized teaming device to process all requests needing support for the second network feature for the second network interface component that does not support the second network feature such that the requests are processed entirely by the centralized teaming device using at least the hardware included in the centralized teaming device and are not processed by hardware in any of the plurality of network interface components; and advertise the first network feature and the second network feature to a higher layer.

8. The IHS of claim 7, wherein the centralized teaming device is further configured to:

advertise the second network feature that is supported by the hardware included in the centralized teaming device to the second network interface component that does not support the second network feature.

9. The IHS of claim7, wherein centralized teaming device is further configured to:

automatically determine whether the plurality of network features are supported and enabled on each of the plurality of network interface components in response to the establishment of the team that includes the plurality of network interface components.

10. The IHS of claim 7, wherein at least one of the plurality of network interface components includes a local area network (LAN) on motherboard (LOM).

11. The IHS of claim 7, wherein at least one of the plurality of network interface components includes of a network interface card (NIC).

12. The IHS of claim 7, wherein the hardware included in the centralized teaming device is associated with a first priority to process requests needing support for the second network feature that is higher than a second priority associated with the software included in the centralized teaming device processing requests needing support for the second network feature.

13. A method for network teaming comprising:

establishing a team with a plurality of network interface components that are coupled to a bus using a centralized teaming device that includes hardware and software;

determining whether a plurality of network features are supported and enabled on each of the plurality of network interface components;

in response to determining that a first network interface component of the plurality of network interface components supports a first network feature and the first network feature is not enabled on the first network interface component, enabling the first network feature on the first network interface component;

in response to determining that a second network interface component of the plurality of network interface components does not support a second network feature that is supported by the hardware included in the centralized teaming device, using the hardware in the centralized teaming device to process requests needing support for the second network feature for the second network interface component that does not support the second network feature such that those requests are not processed by hardware in any of the plurality of network interface components; and advertising the first network feature and the second network feature to a higher layer.

14. The method of claim 13, further comprising:

advertising the second network feature that is supported by the hardware included in the centralized teaming device to the second network interface component that does not support the second network features.

15. The method of claim 13, further comprising:

automatically determining whether the plurality of network features are supported and enabled on each of the plurality of network interface components in response to the establishment of the team that includes the plurality of network interface components.

16. The method of claim 13, wherein at least one of the plurality of network interface components includes a local area network (LAN) on motherboard (LOM).

17. The method of claim 13, wherein at least one of the plurality of network interface components includes a network interface card (NIC).

* * * * *